United States Patent
Galante

[11] Patent Number: 6,129,455
[45] Date of Patent: Oct. 10, 2000

[54] BEARING ASSEMBLY

[75] Inventor: Christopher Robert Galante, Westland, Mich.

[73] Assignee: Ford Motor Company, Dearborn, Mich.

[21] Appl. No.: 09/190,857

[22] Filed: Nov. 10, 1998

[51] Int. Cl.[7] .................................................. F16C 43/04
[52] U.S. Cl. ...................... 384/537; 384/585; 29/898.062
[58] Field of Search .................................... 384/537, 584, 384/585; 29/898.062, 898.07

[56] References Cited

U.S. PATENT DOCUMENTS

| | | | |
|---|---|---|---|
| 4,046,432 | 9/1977 | Hofmann et al. | 384/510 |
| 4,125,298 | 11/1978 | Heurich et al. | 384/537 |
| 4,213,660 | 7/1980 | Yasui et al. | 384/585 |
| 4,848,938 | 7/1989 | Haas et al. | 384/537 |
| 4,888,862 | 12/1989 | Brandenstein et al. | 29/898.054 |
| 5,046,870 | 9/1991 | Ordo | 384/563 |
| 5,058,262 | 10/1991 | Brockmuller et al. | 384/585 X |
| 5,211,489 | 5/1993 | Moore | 384/585 |
| 5,536,075 | 7/1996 | Bertetti | 384/585 X |

FOREIGN PATENT DOCUMENTS

| | | |
|---|---|---|
| 0189365 A1 | 7/1986 | European Pat. Off. . |
| 0538892 A1 | 4/1993 | European Pat. Off. . |

*Primary Examiner*—Thomas R. Hannon
*Attorney, Agent, or Firm*—Raymond L. Coppiellie

[57] ABSTRACT

A bearing assembly comprises a bearing race received in a bore of a housing comprising a deformable housing material. The bearing race includes one or more recesses formed on a surface thereof disposed proximate the housing. Each recess receives housing material that has been deformed locally therein after the bearing race is received in the bore to prevent both rotational and axial motion of the bearing race relative to the housing.

10 Claims, 1 Drawing Sheet

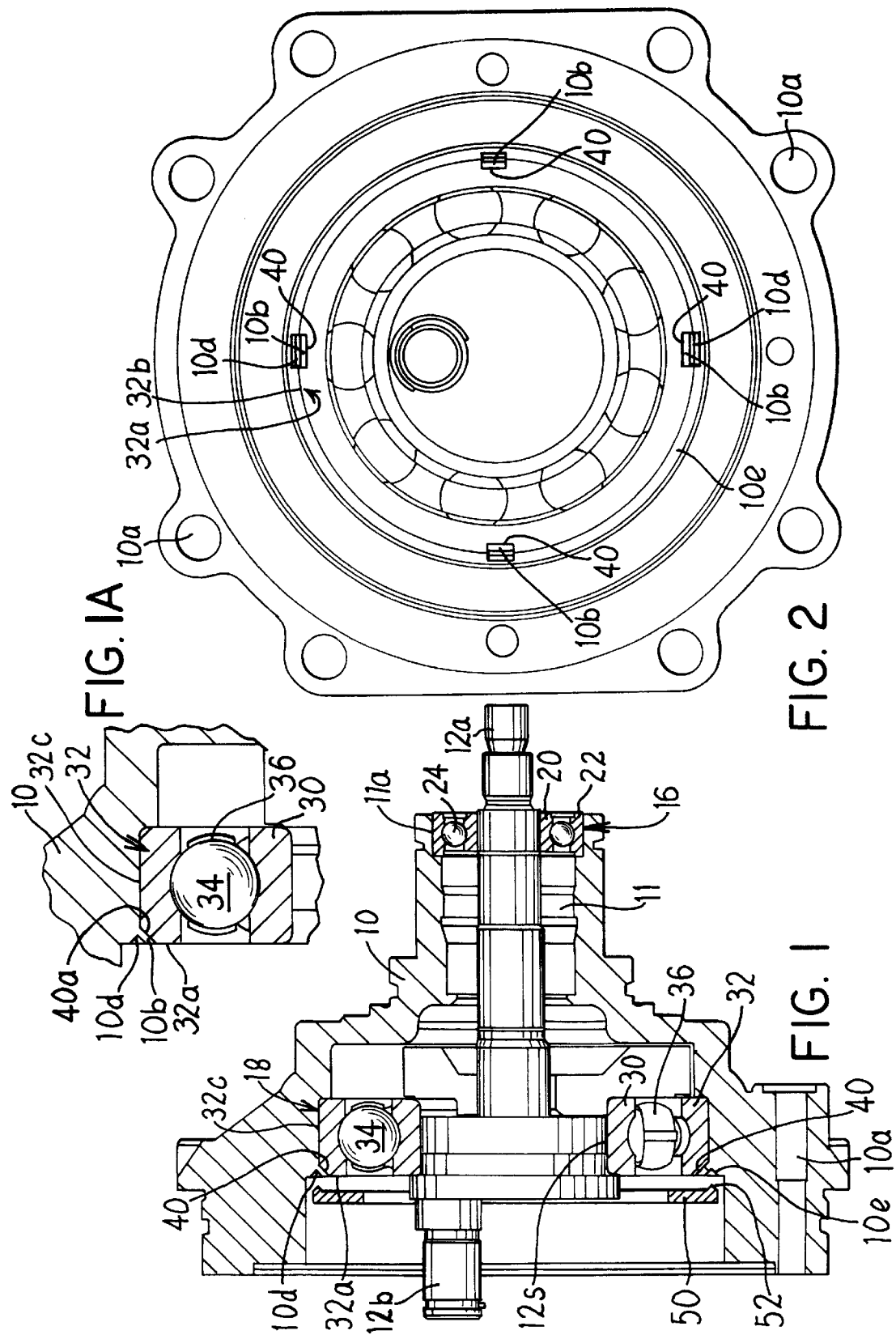

BEARING ASSEMBLY

BACKGROUND OF THE INVENTION

1. Field of the Invention

The present invention relates to a bearing assembly in which a bearing race is mounted in a housing in a manner to prevent rotation and axial motion of the race relative to the housing.

2. Background Information

In a scroll type fluid compressor of a vehicle air conditioning device, an electric clutch is connected to a drive shaft for rotation of an orbiting scroll relative to a fixed scroll in a manner to achieve working fluid compression. The drive shaft is rotatably mounted in an aluminum housing of the compressor device by conventional bearing assemblies press fit in a bore of the housing proximate opposite ends of the shaft.

In operation of the fluid compressor device, the compressor housing and the bearing assembly proximate the orbiting scroll/fixed scroll can experience elevated temperatures to an extent that unwanted movement or creep of the bearing assembly can occur relative to the compressor housing as a result of the considerably higher coefficient of thermal expansion of the aluminum housing relative to that of the hardened steel outer race of the bearing assembly. The bearing assembly has been observed to move or creep rotationally and axially relative to the compressor housing.

An attempt to prevent such bearing creep in the housing has involved molding two nylon rings into respective circumferential grooves formed in the outer bearing race such that the rings are compressed when the bearing assembly is press fit in the housing bore to an extent to prevent rotational creep of he bearing race in the housing. However, use of rings in this manner considerably increases the complexity and cost of the bearing assembly.

An attempt to prevent axial motion of the bearing assembly in the compressor housing has involved mechanically staking the relatively soft aluminum housing material at numerous circumferentially spaced apart locations (e.g. at 12–16 locations) to provide deformed tabs of housing material overlying an annular axial end surface of the hardened steel outer bearing race.

An object of the present invention is to provide a bearing assembly in which a bearing race is mounted in a housing using housing-to-race connections provided in a manner to prevent both rotational and axial movement of the bearing race without the need for molded-on rings compressed between the bearing race and the housing.

SUMMARY OF THE INVENTION

The present invention provides a bearing assembly having a bearing race received in a bore of a housing wherein the bearing race includes one or more recesses formed on a surface thereof disposed proximate the housing. The housing comprises a deformable material that is locally deformed in-situ into each recess after the bearing race is disposed in the housing bore in a manner that the deformed housing material in the recess(es) prevents both rotational and axial motion of the bearing race relative to the housing.

In accordance with an aspect of the present invention, the bearing race includes an annular axial end surface connected by a circumferential edge to an outer circumferential surface. One or more recesses of the bearing race are formed as individual slots in the edge. Each recess preferably includes a chamfered bottom extending between the axial annular end surface and the outer circumferential surface at the edge of the bearing race, each recess being formed in the edge of the bearing race prior to hardening thereof.

In accordance wish another aspect of the present invention, a rotary fluid compressor device comprises a compressor housing and a drive shaft for translating an orbiting rotor relative to a fixed housing. The drive shaft is supported in the bore proximate the orbiting rotor by a bearing assembly having an outer bearing race having a plurality of recesses formed on a surface thereof proximate the housing pursuant to the present invention and into which recesses deformable compressor housing material is deformed after the outer bearing race is received in the bore to prevent both rotational and axial motion of the bearing race relative to the compressor housing without the need for molded-on rings compressed between the compressor housing and the outer bearing race.

The above objects, features and advantages of the present invention will become more readily apparent from the following detailed description taken with the following drawings.

BRIEF DESCRIPTION OF THE DRAWINGS

FIG. 1 is a cross-sectional view of a scroll type compressor housing illustrating an orbiting scroll drive shaft mounted in the housing by a bearing assembly in accordance with an aspect of the present invention. A tool is shown schematically positioned in the housing bore to deform housing material into recesses of the outer bearing race pursuant to the invention.

FIG. 1A is an enlarged view of the bearing assembly of FIG. 1 illustrating a recess in the outer bearing race receiving deformed housing material.

FIG. 2 is an end elevational view of the compressor housing, drive shaft, and bearing assembly.

DESCRIPTION OF THE INVENTION

FIGS. 1 and 2 illustrate a compressor front housing 10 and drive shaft 12 of a conventional scroll type rotary fluid compressor of a vehicle air conditioning device. A driven end 12a of the drive shaft 12 is connected to an electric or other drive clutch (not shown) for rotation of a conventional orbiting scroll rotor (not shown) connected to an opposite eccentric driving end 12b of the drive shaft. The front housing 10 is fastened to a conventional rear housing (not shown) via fasteners received in fastener holes 10a in a manner that the orbiting scroll rotor can be translated by shaft 12 relative to a fixed scroll (not shown) to achieve compression of a working fluid (e.g. refrigerant) as described, for example, in U.S. Pat. No. 4,365,941.

The drive shaft 12 is rotatably mounted in a stepped bore 11 of the housing 10 by first and second ball bearing assemblies 16, 18 that are press fit in the housing proximate opposite ends 12a, 12b of the shaft 12 as illustrated. Bearing assembly 16 comprises a conventional bearing assembly including a hardened steel inner circular race 20 clearance fit on the driven end 12a of the shaft 12, a hardened steel outer circular race 22 press fit in a relatively small diameter bore region 11a of the housing bore 11, and a plurality of hardened steel ball or other bearing elements 24 confined in a conventional bearing retainer (not shown) between the bearing races 20, 22.

In accordance with an aspect of the present invention, the bearing assembly 18 press fit on the shaft drive end 12b proximate the orbiting/fixed scrolls includes features to prevent bearing motion or creep relative to the housing 10 when these regions experience elevated temperatures during operation of the compressor device, for example, as a result of high operating loads or reduced refrigerant charge. Such bearing creep is exacerbated as a result of the quite different coefficients of thermal expansion of the aluminum or aluminum alloy housing 10 and the hardened steel components of the bearing assembly 18. Namely, the bearing assembly includes a hardened steel inner circular race 30, outer circular race 32, and ball or other bearing elements 34 confined within a conventional bearing retainer 36 between the races 30, 32. The hardened steel bearing assembly components exhibit a much higher coefficient of thermal expansion than the housing 10 comprising aluminum.

The bearing assembly 16 normally does not experience such high elevated temperatures as the bearing assembly 18 due to the bearing assembly 16 being located on the low pressure side of the compressor.

In practice of an embodiment of the present invention, the bearing assembly 18 is positioned in bore 11 by slip fitting inner bearing race 30 on an enlarged diameter shoulder 12s of the shaft 12 proximate the eccentric shaft drive end 12a, while the outer bearing race 32 is press fit in an opposing relatively large diameter bore region of the housing 10 as shown with the ball or other bearing elements 34 between the races 30, 32. The outer bearing race 32 includes a plurality (four illustrated) of circumferentially spaced apart recesses 40 on a surface thereof disposed proximate the housing 10. For example, the outer bearing race 32 includes an annular axial end surface 32a connected by a circumferential radiused edge 32b to an outer circumferential surface 32c with the recesses 40 being formed as individual, axially extending slots in the edge 32b.

Each recess 40 preferably includes a chamfered flat bottom 40a extending between the annular end surface 32a and the circumferential surface 32c at the edge 32b of the bearing race 32. The chamfered bottom 40a can be oriented at an included acute angle of about 45 degrees relative to the longitudinal axis of the bore 11 for individual recess width and length dimensions of 0.125 inch and 0.25 inch, respectively, in an embodiment of the invention offered for purposes of illustration and not limitation of the present invention.

Although four chamfered recesses 40 spaced circumferentially ninety degrees apart are illustrated in FIGS. 1 and 2, other numbers of recesses can be provided in the outer bearing race 32 in the practice of the invention. Moreover, other recess configurations may be used in the practice of the invention. For example, one or more regions of serrations, concavities or other recessed surface features can be employed in lieu of or in addition to recesses 40 to this end. Moreover, the inner bearing race 30 can be provided with similar anti-creep features pursuant to the invention as may be needed under particular compressor operating conditions.

The recesses 40 typically are formed in the bearing race 32 by stamping, grinding or other machining operation of the circumferential edge 32b prior to hardening (e.g. tempering) of the steel bearing race to high hardness. That is, the recesses 40 are formed in the bearing race 32 while it is in a relatively soft condition amenable for stamping, machining or other recess-forming operations.

FIGS. 1 and 1A illustrate the compressor housing 10 after it has been locally and permanently deformed proximate the individual recesses 40 subsequent to positioning of the bearing assembly 18 in the housing 10. In particular, proximate each recess 40, a flap or wedge 10b of deformable aluminum or aluminum alloy housing material is shown displaced into each recess 40 to lock the outer bearing race 32 against both rotational and axial motion relative to the housing 10 even when elevated temperature conditions are experienced by the housing 10 and bearing assembly 18 as a result of compressor over-heating.

Referring to FIG. 1, an annular tool 50 is shown positioned in housing bore 11 and includes a plurality of wedge-shaped teeth 52 corresponding in number and general location to the number of recesses 40 on the bearing race 32. The teeth 52 have a wedge shape configuration adapted to locally engage and plastically deform the deformable housing material into each respective recess 40 by axial advancement of the tool along the longitudinal axis of the bore 11. The teeth 52 plastically displace the housing material locally proximate each respective recess 40 as illustrated in FIG. 1A as a flap or wedge 10b of deformed housing material, leaving a dimple 10d in the adjacent deformed housing surface 10e. The tool 50 is advanced axially in the bore 11 to this end by a conventional hydraulic press, for example, under ambient temperature conditions to plastically deform the housing material into the recesses 40. Following deformation of the housing material into the recesses 40, the tool 50 is withdrawn from the bore 11.

Both rotational and axial motion of the outer bearing race 32 relative to the compressor housing 10 thereby is prevented by practice of the present invention without the need for costly molded-on rings heretofore compressed between the compressor housing and the outer bearing race to prevent rotational bearing race creep.

Although the invention is described above with respect to a bearing assembly of a scroll type compressor device, the invention is not so limited and can be practiced in myriad other applications, including other types of rotary fluid compressors such as orbiting ring fluid compressors, to mount a bearing race in a housing in a manner to prevent both rotational and axial motion of the bearing race relative to the housing. Moreover, while the invention is described above in terms of specific embodiments, it is not intended to be limited thereto but rather only to the extent set forth in the following claims.

I claim:

1. Bearing assembly, comprising a housing having a bore and comprising a deformable housing material, and a bearing race received in said bore, said bearing race having at least one recess formed on a surface thereof disposed proximate said housing, said recess receiving said housing material that has been deformed locally into said recess after said bearing race is received in said bore to prevent both rotational and axial motion of said bearing race relative to said housing.

2. The bearing assembly of claim 1 wherein said bearing race includes an annular axial end surface connected by a circumferential edge to an outer circumferential surface, each said recess being formed as a slot in said edge.

3. The bearing assembly of claim 2 wherein each said recess includes a chamfered bottom extending between said axial end surface and said outer circumferential surface at said edge.

4. The bearing assembly of claim 1 wherein said bearing race includes a plurality of said recesses circumferentially spaced apart on said surface.

5. A rotary fluid compressor device, comprising a compressor housing having a bore and comprising a deformable housing material, a drive shaft for translating an orbiting rotor, and a bearing assembly for mounting said drive shaft in said bore, said bearing assembly including a bearing race received in said bore, said bearing race having a plurality of peripherally spaced apart recesses formed on a surface thereof disposed proximate said housing, each said recess receiving said housing material that has been deformed therein after said bearing race is received in said bore to prevent both rotational and axial motion of said bearing race relative to said housing.

6. The compressor device of claim 5 wherein said bearing race comprises hardened steel and said compressor housing material comprises aluminum.

7. The compressor device of claim 5 wherein said bearing race includes an annular axial end surface connected by a circumferential edge to an outer circumferential surface, each said recess being formed as a slot in said edge.

8. The compressor device of claim 7 wherein each said recess includes a chamfered bottom extending between said axial end surface and said outer circumferential surface at said edge.

9. A method of mounting a bearing race in a bore of a housing comprising a deformable housing material, comprising the steps of forming at least one recess on a surface of said bearing race to be disposed proximate said housing, positioning said bearing race in said bore with said recess proximate said housing, and deforming said housing proximate said recess using a tool positioned in said bore in a manner to locally displace housing material into said recess such that both rotational and axial motion of said bearing race relative to said housing is prevented.

10. The method of claim 9 wherein said recess is formed in said bearing race prior to a hardening heat treatment thereof.

* * * * *